(12) United States Patent
Huang et al.

(10) Patent No.: US 11,879,177 B2
(45) Date of Patent: Jan. 23, 2024

(54) SELF-SUPPORTING ELECTROCATALYTIC MATERIAL AND PREPARATION METHOD THEREOF

(71) Applicant: SHAANXI UNIVERSITY OF SCIENCE & TECHNOLOGY, Shaanxi (CN)

(72) Inventors: Jianfeng Huang, Xi' an (CN); Guojuan Hai, Xi' an (CN); Liyun Cao, Xi' an (CN); Liangliang Feng, Xi' an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 344 days.

(21) Appl. No.: 17/451,039

(22) Filed: Oct. 15, 2021

(65) Prior Publication Data
US 2022/0127737 A1 Apr. 28, 2022

(30) Foreign Application Priority Data
Oct. 22, 2020 (CN) .......................... 202011139053.3

(51) Int. Cl.
C23C 18/12 (2006.01)
C25B 11/091 (2021.01)
C25B 1/04 (2021.01)
C25B 11/054 (2021.01)
C25B 11/073 (2021.01)

(52) U.S. Cl.
CPC .......... *C25B 11/091* (2021.01); *C23C 18/125* (2013.01); *C23C 18/1216* (2013.01); *C23C 18/1225* (2013.01); *C23C 18/1241* (2013.01); *C25B 1/04* (2013.01); *C25B 11/054* (2021.01); *C25B 11/073* (2021.01)

(58) Field of Classification Search
CPC ............ C23C 18/1216; C23C 18/1225; C23C 18/1241; C23C 18/125
See application file for complete search history.

(56) References Cited

U.S. PATENT DOCUMENTS

2018/0087164 A1\* 3/2018 Finke ........................ C25B 1/04

\* cited by examiner

*Primary Examiner* — Hai Y Zhang
(74) *Attorney, Agent, or Firm* — Alleman Hall Creasman & Tuttle LLP (57) ABSTRACT

The present disclosure relates to a self-supporting electrocatalytic material and a preparation method thereof, the self-supporting electrocatalytic material is a $Cu_2O/WO_3/CF$ self-supporting electrocatalytic material. The $Cu_2O/WO_3/CF$ self-supporting electrocatalytic material comprises: a foamed copper substrate, and $Cu_2O$ and $WO_3$ grown in situ on the foamed copper substrate.

12 Claims, 4 Drawing Sheets

SELF-SUPPORTING ELECTROCATALYTIC MATERIAL AND PREPARATION METHOD THEREOF

TECHNICAL FIELD

The present disclosure relates to a self-supporting electrocatalytic material, in particular to a $Cu_2O/WO_3/CF$ self-supporting electrocatalytic material and a $NiOOH/Cu_2O/WO_3/CF$ self-supporting electrocatalytic material and a preparation method thereof, which belongs to the technical field of composite materials.

BACKGROUND

The electrochemical decomposition of water into hydrogen and oxygen is an effective method for fundamentally realizing the strategy of the conversion and storage of renewable energy, and solving the global energy and environmental problems. In this process, the conversion efficiency is limited by the high overpotential. At present, the noble metal Pt-based materials are considered to be the most effective hydrogen evolution reaction (HER) electrocatalysts, and Ir/Ru and its oxides are considered to show excellent oxygen evolution reaction (OER) electrocatalytic properties in both acidic and alkaline electrolytes. However, due to the low content of these precious metal materials in the earth crust and the high cost, their commercial large-scale application has been limited. The development of new sustainable non-noble metal electrocatalytic materials with low cost and high efficiency is the key.

$WO_3$ belongs to n-type semiconductors, which are composed of regular octahedral perovskite units, have unique optical, electronic, and chemical properties, and have been widely used in sensors, catalysis, electrochromic, and other fields in recent years. $WO_3$ material has a fast electron transfer speed (12 $cm^2$ $V^{-1}$ $s^{-1}$), a suitable hole diffusion length (150 nm), and a wide light absorption range (12%). Therefore, $WO_3$ is a promising photoelectric catalytic material. However, the $WO_3$ nanomaterial obtained by current research has some shortcomings such as a small specific surface area, few catalytic active sites, high and unstable hydrogen and oxygen production over-potential, which limits their catalytic activity. Oxygen defects in metal oxides act as active sites to improve conductivity and facilitate the adsorption and desorption of water molecules or intermediate reaction substances (for example, ·H in HER; ·OH and ·OOH in OER), thereby further illustrating that the introduction of oxygen defects into $WO_3$ materials is expected to improve the electrocatalytic performance of $WO_3$ materials. At the same time, through processes such as compounding, the electronic structure of $WO_3$ is adjusted, the oxygen defect content can be effectively increased, so that the electrocatalytic active sites are increased and the electrocatalytic performance is optimized.

At present, the use of copper-based materials for oxygen evolution catalysts has attracted wide attention. Copper-based materials have the advantages of abundant reserves, low cost, and simple synthesis of their compounds. Cu-based metal oxides are good electrode materials. However, although $Cu_2O$ materials are used as photocatalytic materials, there are relatively few studies on their use in electrocatalysis. Therefore, it is necessary to further research and explore $Cu_2O$ electrocatalytic materials. In addition, in order to avoid the influence of the binder on the conductivity and active area of the catalyst during the preparation of the working electrode, the direct synthesis of $WO_3$ nanostructured catalyst on the conductive substrate can effectively improve the electrocatalytic performance. Foamed copper with high abundance and low price has attracted widespread attention, because of its large specific surface area, high electronic conductivity, and ideal 3D open cell structure, it is widely used as a support system for electrode materials.

Foamed copper is a new multifunctional material with a large number of connected or unconnected pores uniformly distributed in the copper matrix. Foamed copper has good conductivity and ductility, and its preparation cost is lower than that of foamed nickel, and its conductivity is better than that of foamed nickel. It is a potential multi-dimensional carrier for the preparation of battery anode materials, catalysts, and electromagnetic shielding materials. Compared with metal materials, there are many advantages to using highly conductive carbon materials (such as carbon fiber, carbon cloth, carbon paper, etc.) as a carrier, such as their light weight, stable chemical properties, and environmental friendliness, etc. However, due to their good chemical inertness, the compatibility between carbon materials and various inorganic materials is poor, so it is difficult to directly and effectively grow active substances on their surfaces. Therefore, it is of great significance to develop an effective method to directly grow a highly active composite material on the foamed copper conductive substrate and directly use it for electrocatalytic hydrogen production.

SUMMARY

In view of the above problems, the present disclosure provides a new self-supporting electrocatalytic material and a preparation method thereof. The purpose of the present disclosure is to synthesize a high-efficiency hydrogen evolution reaction (HER) electrocatalytic material by adopting a multi-step method, and the structure of the prepared self-supporting electrocatalytic material is controllable, and the product has the structure of a nanowire ($WO_3$) regular tetrahedron ($Cu_2O$) and ultra-small nanoparticles (NiOOH) at the same time, and the structures of nanowire, regular tetrahedron and ultra-small nanoparticle are uniformly distributed. The prepared material shows better electrocatalytic performance in neutral solution.

In a first aspect, the present disclosure provides a $Cu_2O/WO_3/CF$ self-supporting electrocatalytic material, comprising: a foamed copper substrate, and $Cu_2O$ and $WO_3$ grown in situ on the foamed copper substrate.

According to the present disclosure, the foamed copper is used as a copper source for the first time, and a $Cu_2O$ tetrahedral structure and a $WO_3$ nanowire structure are grown in situ on the surface of the foamed copper substrate by a one-step method, so that the influence of an adhesive on the conductivity and activity of the catalyst during the preparation of a working electrode is avoided, and the electrocatalytic performance can be effectively improved.

Preferably, the total loading capacity of $Cu_2O$ and $WO_3$ is 0.5 to 4 $mg/cm^2$.

Preferably, the molar ratio of $WO_3$ and $Cu_2O$ is 1:(0.5 to 1).

In a second aspect, the present disclosure provides a $Cu_2O/WO_3/CF$ self-supporting electrocatalytic material. The $Cu_2O/WO_3/CF$ self-supporting electrocatalytic material also includes NiOOH grown in situ on the foamed copper substrate, which is designed as a $NiOOH/Cu_2O/WO_3/CF$ self-supporting electrocatalytic material. In other words, the $NiOOH/Cu_2O/WO_3/CF$ self-supporting electrocatalytic material comprises: a foamed copper substrate, and NiOOH, $Cu_2O$, and $WO_3$ grown on the foamed copper substrate. Among them, NiOOH nanoparticles are distributed in both $Cu_2O$ and $WO_3$.

In the present disclosure, the foamed copper substrate (CF) can improve the exposure of active sites of products due to its high specific surface, high electronic conductivity and 3D open-cell structure, which is beneficial to the improvement of electrocatalytic performance. Therefore, the $Cu_2O$ tetrahedron structure is grown in situ by taking the foamed copper as the copper source for the first time, and the NiOOH and $WO_3$ are directly grown on the foamed copper substrate (CF) at the same time, so that the influence of the adhesive on the conductivity and activity of the catalyst during the preparation of the working electrode is avoided and the electrocatalytic performance can be effectively improved by utilizing the synergistic effect.

Preferably, the total loading capacity of NiOOH, $Cu_2O$, and $WO_3$ in the $Cu_2O/WO_3/CF$ self-supporting electrocatalytic material is 0.5 to 4 $mg/cm^2$.

Preferably, the molar ratio of $WO_3$, $Cu_2O$, and NiOOH is 1:(0.5 to 1):(0.01 to 0.05).

In a third aspect, the present disclosure also provides a preparation method of the above mentioned $Cu_2O/WO_3/CF$ self-supporting electrocatalytic material, comprising:
(1) dissolving a tungsten source in absolute ethanol to obtain a first solution;
(2) immersing the foamed copper in a high-pressure reaction kettle containing the first solution, reacting at 100 to 200° C. for 1 to 36 hours, and then centrifuging, washing, and drying to obtain the $Cu_2O/WO_3/CF$ self-supporting electrocatalyst material.

Preferably, the tungsten source is selected from at least one of the ammonium tungstate $(NH_4)_6W_7O_{24} \cdot 6H_2O$, ammonium paratungstate $(NH_4)_{10}[H_2W_{12}O_{42}]$, ammonium metatungstate $(NH_4)_6H_2W_{12}O_{40}$, tungsten isopropoxide $W(OCH(CH_3)_2)_6$, and tungsten hexachloride $WCl_6$; the concentration of the tungsten source in the first solution is 0.01 to 5 mol/L.

Preferably, the volume filling ratio of the high-pressure reaction kettle containing the first solution is 20 to 60%.

In a fourth aspect, the present disclosure also provides a preparation method of the above mentioned $Cu_2O/WO_3/CF$ self-supporting electrocatalytic material, comprising:
(1) dissolving a tungsten source in absolute ethanol to obtain the first solution;
(2) immersing the foamed copper grown with NiOOH and $Cu_2O$ in a high-pressure reaction kettle containing the first solution, reacting at 100 to 200° C. for 1 to 36 h, and then centrifuging, washing, and drying to obtain a $NiOOH/Cu_2O/WO_3/CF$ self-supporting electrocatalytic material.

Preferably, the concentration of the tungsten source in the first solution is 0.01 to 5 mol/L.

Preferably, the tungsten source is selected from at least one of ammonium tungstate $(NH_4)_6W_7O_{24} \cdot 6H_2O$, ammonium paratungstate $(NH_4)_{10}[H_2W_{12}O_{42}]$, ammonium metatungstate $(NH_4)_6H_2W_{12}O_{40}$, tungsten isopropoxide $W(OCH(CH_3)_2)_6$, and tungsten hexachloride $WCl_6$.

Preferably, the volume filling ratio of the high-pressure reaction kettle containing the first solution is 20 to 60%.

Preferably, the foamed copper grown with NiOOH and $Cu_2O$ is prepared by:
(1) dissolving a nickel source in water to obtain a second solution;
(2) immersing the foamed copper in a high-pressure reaction kettle containing the second solution, reacting at 160 to 200° C. for 6 to 12 hours, and then washing and drying to obtain the foamed copper with NiOOH and $Cu_2O$.

Also, preferably, the nickel source is selected from at least one of nickel acetate $Ni(CH_3COO)_2$, nickel oxalate dihydrate $NiC_2O_4 \cdot 2H_2O$, nickel chloride hexahydrate $NiCl_2 \cdot 6H_2O$, and nickel nitrate hexahydrate $NiN_2O_6 \cdot 6H_2O$; the concentration of the nickel source is 0.01 to 5 mol/L;

Preferably, the volume filling ratio of the high-pressure reaction kettle containing the second solution is 20 to 80%.

Beneficial Effects (1) The $NiOOH/Cu_2O/WO_3$ composite material is synthesized by a two-step method in the present disclosure. The $Cu_2O$ is in situ synthesized with foamed copper as a raw material, and the composite material is directly grown on the foamed copper substrate; at the same time, the $Cu_2O$ and $WO_3$ are directly grown on the foamed copper by a one-step method in the present disclosure;
(2) the present disclosure has mild reaction condition, easy realization, and easy control of the process;
(3) the composite material prepared by the present disclosure has a large number of oxygen defects;
(4) the $NiOOH/Cu_2O/WO_3$ self-supporting electrocatalytic material prepared by the present disclosure exhibits better electrocatalytic performance in a neutral electrolyte.

DETAILED DESCRIPTION

The present disclosure will be further described below through the following embodiments. It should be understood that the following embodiments are only used to illustrate the present disclosure, not to limit the present disclosure.

In this disclosure, for the first time, NiOOH, $Cu_2O$ and $WO_3$ are compounded and directly grown on foamed copper by a two-step method to prepare a $NiOOH/Cu_2O/WO_3/CF$ self-supporting electrocatalytic material rich in oxygen defects. Among them, the optimal total loading capacity of $NiOOH/Cu_2O/WO_3$ is 0.5 to 4 $mg/cm^2$. The molar ratio of $WO_3$, $Cu_2O$, and NiOOH is 1:(0.5 to 1):(0.01 to 0.05).

The following exemplarily illustrates the preparation method of the $NiOOH/Cu_2O/WO_3/CF$ self-supporting electrocatalytic material.

Cleaning of the foamed copper substrate. Take a 50 mL beaker, and completely immerse the foamed copper with a length of 3 to 7 cm and a width of 1 to 2 cm into acetone, HCl solution of 2 to 6 mol/L, deionized water, and absolute ethanol in sequence, and carry out ultrasonic treatment for 15 to 30 minutes respectively.

Preparation of foamed copper grown with $NiOOH/Cu_2O$. The type, concentration, and reaction temperature of the selected nickel source in the present disclosure are very important. The target product phase that is not suitable for the preparation cannot be synthesized, and the product loading is too large or too small, so that the product is difficult to directly grow on the foamed copper or cause the composite product to fall off from the foamed copper in the subsequent composite synthesis stage.

The analytically reagent nickel acetate $Ni(CH_3COO)_2$ is added as a nickel source to 20 to 80 mL of deionized water, and stirred for 20 to 60 minutes to form a uniformly mixed solution A. Among them, the nickel source can also be selected from nickel acetate $Ni(CH_3COO)_2$, nickel oxalate dihydrate $NiC_2O_4 \cdot 2H_2O$, nickel chloride hexahydrate $NiCl_2 \cdot 6H_2O$, and nickel nitrate hexahydrate $NiN_2O_6 \cdot 6H_2O$, etc. The concentration of Ni source in the solution A can be 0.01 to 5 mol/L.

The foamed copper is immersed in a polytetrafluoroethylene-lined autoclave containing the solution A and sealed, and the volume filling ratio keeps between 20% and 80%. Putting the sealed high-pressure reactor into a homogeneous hydrothermal reactor, the temperature parameter can be set to 160 to 200° C., and the reaction time can be 6 to 12 hours.

After the reaction is completed, cooling to room temperature, and then centrifuging, washing, and drying to obtain foamed copper with $NiOOH/Cu_2O$ grown on the surface. Among them, washing includes washing with deionized water 3 to 5 times. Among them, drying includes putting the washed foamed copper into a 50 to 70° C. vacuum oven and drying for 5 to 8 hours, or putting in a freeze drying oven at −40 to −60° C. for 5 to 8 hours.

As a tungsten source, analytical reagent ammonium tungstate $(NH_4)_6W_7O_{24} \cdot 6H_2O$ is dissolved and added to 20 to 80 mL of absolute ethanol, and stir for 20 to 60 minutes to form a uniformly mixed solution B. Among them, the tungsten source can also be selected from one of ammonium tungstate $(NH_4)_6W_7O_{24} \cdot 6H_2O$, ammonium paratungstate $(NH_4)_{10}[H_2W_{12}O_{42}]xH_2O$, ammonium metatungstate $(NH_4)_6H_2W_{12}O_{40} \cdot XH_2O$, and tungsten isopropoxide $W(OCH(CH_3)_2)_6$ and tungsten hexachloride $WCl_6$, etc. The concentration of the tungsten source in the solution B can be 0.01 to 5 mol/L.

The $NiOOH/Cu_2O$-grown foamed copper or pure foamed copper is immersed in a polytetrafluoroethylene lined autoclave containing the solution B and sealed, and the volume filling ratio is maintained between 20% and 60%. Putting the sealed high-pressure reactor into a homogeneous hydrothermal reactor, the temperature parameter can be set to 100 to 200° C., and the reaction time can be 1 to 36 hours.

After the reaction is completed, cooling to room temperature, and then centrifuging, washing, and drying to obtain foamed copper grown with $NiOOH/Cu_2O/WO_3$ or foamed copper grown with $Cu_2O/WO_3$. Among them, washing includes washing with deionized water 3 to 5 times. Among them, drying includes putting the washed foamed copper into a vacuum oven at 50 to 70° C. and drying for 5 to 8 hours, or putting in a freeze drying oven at −40 to −60° C. for 5 to 8 hours.

Hereinafter, the present disclosure will be further described with the following examples. It should be understood that the following examples are used to explain this invention and do not mean to limit the scope of this invention. Any non-essential improvements and modifications made by a person skilled in the art based on this invention all fall into the protection scope of this invention. The specific process parameters below are only exemplary, and a person skilled in the art can choose proper values within an appropriate range according to the description, and are not restricted to the specific values shown below.

Example 1

(1) Prepared a nickel acetate $Ni(CH_3COO)_2 \cdot 4H_2O$ solution A with a concentration of 0.05 mol/L. Specifically, $Ni(CH_3COO)_2 \cdot 4H_2O$ was added to 40 mL of deionized water and stirred for 30 minutes to form a uniformly mixed solution A;

(2) Put the solution A into a polytetrafluoroethylene lined autoclave, the volume filling ratio was maintained at 40%;

(3) Took a 50 mL beaker, and completely immerse the foamed copper with a length of 6 cm and a width of 1 cm into acetone, 3 mol/L HCl solution, deionized water, and absolute ethanol in sequence, and carried out ultrasonic treatment separately for 30 minutes. Put the processed foamed copper into a polytetrafluoroethylene reactor containing the solution A; put the sealed reactor into a homogeneous hydrothermal reactor, the temperature parameter was set to 160° C., and the reaction time was 12 hours;

(4) After the reaction was completed and cooled to room temperature, the foamed copper after the reaction was taken out and washed with absolute ethanol and deionized water 3 times;

(5) Prepared a solution B of tungsten hexachloride $WCl_6$ with a concentration of 0.05 mol/L. Specifically, added $WCl_6$ to 40 mL of deionized water and stirred it for 30 minutes to form a uniformly mixed solution B;

(6) Immersed the $NiOOH/Cu_2O$-grown foamed copper in a polytetrafluoroethylene lined autoclave containing the solution B and sealed it, and the volume filling ratio was maintained at 40%. Put the sealed autoclave into a homogeneous hydrothermal reactor, the temperature parameter was set to 160° C., and the reaction time was 12 hours;

(7) After the reaction was completed, cooled to room temperature, took out the foamed copper after the reaction, and washed with absolute ethanol and deionized water 3 times. Put it into a 60° C. vacuum oven or a freeze-drying oven to dry for 6 hours to obtain a $NiOOH/Cu_2O/WO_3/CF$ self-supporting electrocatalytic material. The total loading of $NiOOH/Cu_2O/WO_3$ was 0.86 $mg/cm^2$. The molar ratio of $WO_3$ and $Cu_2O$ was 1:0.5. The molar ratio of $WO_3$, $Cu_2O$, and NiOOH was 1:0.5:0.01.

Example 2

(1) Prepared a nickel acetate Ni(CH$_3$COO)$_2$·4H$_2$O solution A with a concentration of 1 mol/L. Specifically, Ni(CH$_3$COO)$_2$·4H$_2$O was added to 60 mL of deionized water and stirred for 30 minutes to form a uniformly mixed solution A;

(2) Put the solution A into a polytetrafluoroethylene lined autoclave, the volume filling ratio was maintained at 60%;

(3) Took a 50 mL beaker, and completely immersed the foamed copper with a length of 6 cm and a width of 2 cm in acetone, 4 mol/L HCl solution, deionized water, and absolute ethanol in sequence, and carried out ultrasonic treatment separately for 30 minutes. Put the processed foamed copper into a polytetrafluoroethylene reactor containing the solution A; put the sealed reactor into a homogeneous hydrothermal reactor, the temperature parameter was set to 200° C., and the reaction time was 12 hours;

(4) After the reaction was completed and cooled to room temperature, the foamed copper after the reaction was taken out and washed with absolute ethanol and deionized water 3 times.

(5) Prepared a solution B of ammonium tungstate (NH$_4$)$_6$W$_7$O$_{24}$·6H$_2$O with a concentration of 1 mol/L. Specifically, added (NH$_4$)$_6$W$_7$O$_{24}$·6H$_2$O to 40 mL of deionized water and stirred it for 30 minutes to form a uniformly mixed solution B;

(6) Immersed the NiOOH/Cu$_2$O-grown foamed copper in a polytetrafluoroethylene lined autoclave containing the solution B and sealed it, and the volume filling ratio was maintained at 40%. Put the sealed autoclave into a homogeneous hydrothermal reactor, the temperature parameter was set to 140° C., and the reaction time was 24 hours;

(7) After the reaction was completed and cooled to room temperature, the foamed copper after the reaction was taken out and washed with absolute ethanol and deionized water 3 times. Put it into a 60° C. vacuum oven or a freeze-drying oven to dry for 6 hours to obtain a NiOOH/Cu$_2$O/WO$_3$/CF self-supporting electrocatalytic material. The total loading of NiOOH/Cu$_2$O/WO$_3$ in the obtained NiOOH/Cu$_2$O/WO$_3$/CF self-supporting electrocatalytic material was 1.5 mg/cm$^2$. The molar ratio of WO$_3$, Cu$_2$O, and NiOOH was 1:0.3:0.03.

Example 3

(1) Prepared a nickel oxalate dihydrate NiC$_2$O$_4$·2H$_2$O solution A with a concentration of 3 mol/L. Specifically, NiC$_2$O$_4$·2H$_2$O was added to 50 mL of deionized water and stirred for 30 minutes to form a uniformly mixed solution A;

(2) Put the solution A into a polytetrafluoroethylene lined autoclave, the volume filling ratio was maintained at 50%;

(3) Took a 50 mL beaker, and completely immersed the foamed copper with a length of 7 cm and a width of 1 cm into acetone, 3 mol/L HCl solution, deionized water, and absolute ethanol in sequence, and carried out ultrasonic treatment separately for 30 minutes. Put the processed foamed copper into a polytetrafluoroethylene reactor containing the solution A; put the sealed reactor into a homogeneous hydrothermal reactor, the temperature parameter was set to 180° C., and the reaction time was 18 hours;

(4) After the reaction was completed and cooled to room temperature, the foamed copper after the reaction was taken out and washed with absolute ethanol and deionized water for 3 times;

(5) Prepared a solution B of tungsten hexachloride WCl$_6$ with a concentration of 4 mol/L. Specifically, added WCl$_6$ to 60 mL of deionized water and stirred it for 30 minutes to form a uniformly mixed solution B;

(6) Immersed the NiOOH/Cu$_2$O-grown foamed copper in a polytetrafluoroethylene lined autoclave containing the solution B and sealed it, and the volume filling ratio was maintained at 60%. Put the sealed autoclave into a homogeneous hydrothermal reactor, the temperature parameter was set to 140° C., and the reaction time was 30 hours;

(7) After the reaction was completed, cooled to room temperature, took out the foamed copper after the reaction, and washed with absolute ethanol and deionized water 3 times. Put it into a 60° C. vacuum oven or a freeze-drying oven to dry for 6 hours to obtain a NiOOH/Cu$_2$O/WO$_3$/CF self-supporting electrocatalytic material. The total loading of NiOOH/Cu$_2$O/WO$_3$ was 3 mg/cm$^2$. The molar ratio of WO$_3$, Cu$_2$O, and NiOOH was 1:0.6:0.05.

Example 4

(1) Prepared a nickel nitrate hexahydrate NiN$_2$O$_6$·6H$_2$O solution A with a concentration of 4 mol/L. Specifically, NiN$_2$O$_6$·6H$_2$O was added to 80 mL of deionized water and stirred for 30 minutes to form a uniformly mixed solution A;

(2) Put the solution A into a polytetrafluoroethylene lined autoclave, the volume filling ratio was maintained at 80%;

(3) Took a 50 mL beaker, and completely immersed the foamed copper with a length of 5 cm and a width of 2 cm into acetone, 6 mol/L HCl solution, deionized water, and absolute ethanol in sequence, and carried out ultrasonic treatment separately for 30 minutes. Put the processed foamed copper into a polytetrafluoroethylene reactor containing the solution A; put the sealed reactor into a homogeneous hydrothermal reactor, the temperature parameter was set to 160° C., and the reaction time was 6 hours;

(4) After the reaction was completed and cooled to room temperature, the foamed copper after the reaction was taken out and washed with absolute ethanol and deionized water 3 times;

(5) Prepared a solution B of tungsten isopropoxide W(OCH(CH$_3$)$_2$)$_6$ with a concentration of 2 mol/L. Specifically, added W(OCH(CH$_3$)$_2$)$_6$ to 40 mL of deionized water and stirred it for 30 minutes to form a uniformly mixed solution B;

(6) Immersed the NiOOH/Cu$_2$O-grown foamed copper in a polytetrafluoroethylene lined autoclave containing the solution B and sealed it, and the volume filling ratio was maintained at 40%. Put the sealed autoclave into a homogeneous hydrothermal reactor, the temperature parameter was set to 160° C., and the reaction time was 24 hours;

(7) After the reaction was completed and cooled to room temperature, the foamed copper after the reaction was taken out and washed with absolute ethanol and deionized water 3 times. Put it into a 60° C. vacuum oven or a freeze-drying oven to dry for 6 hours to obtain a NiOOH/Cu$_2$O/WO$_3$/CF self-supporting electrocatalytic material. The total loading of $NiOOH/Cu_2O/WO_3$ was 2.8 mg/cm². The molar ratio of $WO_3$ and $Cu_2O$ was 1:0.5. The molar ratio of $WO_3$, $Cu_2O$, and NiOOH was 1:0.55:0.03.

Example 5

The preparation process of the $Cu_2O/WO_3/CF$ electrocatalytic material in Example 5 referring to Example 1, the difference was that the $Cu_2O/WO_3$ foamed copper was obtained only by a one-step solvothermal method, that is, only the steps of step 5 to step 7 in Example 1 were performed, and what was added in step 6 was the foamed copper that had not grown anything. In the obtained $Cu_2O/WO_3/CF$ self-supporting electrocatalytic material, the loading capacity of $Cu_2O/WO_3$ was 0.7 mg/cm², and the molar ratio of $WO_3$ and $Cu_2O$ was 1:0.5.

Comparative Example 1

The preparation process of the $NiOOH/Cu_2O/CF$ self-supporting electrocatalytic material in this comparative example 1 referred to Example 1, the difference was that the foamed copper grown with $NiOOH/Cu_2O$ was obtained only by one-step hydrothermal method, that is, only the steps of 1 to 4 of the Example 1 was performed, the solvothermal reaction process of the steps 5 to 7 was not performed. In the obtained $NiOOH/Cu_2O/CF$ self-supporting electrocatalytic material, the loading capacity of $NiOOH/Cu_2O$ was 0.28 mg/cm². The molar ratio of NiOOH and $Cu_2O$ was 0.02:1.

Figure 1:
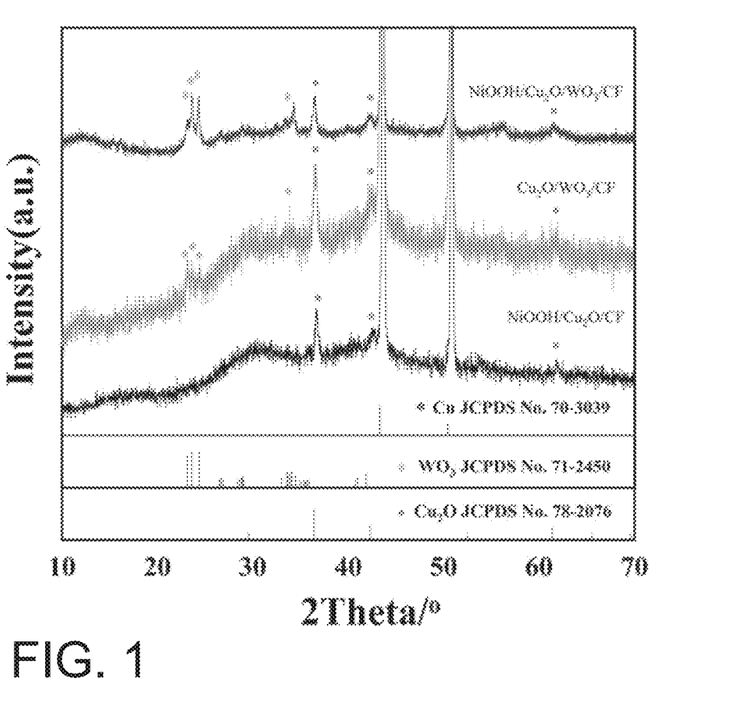
FIG. 1 shows X-ray diffraction (XRD) spectra of $NiOOH/Cu_2O/WO_3/CF$, $Cu_2O/WO_3/CF$ and $NiOOH/Cu_2O/CF$ prepared under the conditions of Example 1, Comparative Example 1, and Example 5.

FIG. 1 shows the X-ray diffraction (XRD) spectra of $NiOOH/Cu_2O/WO_3/CF$, $Cu2O/WO3/CF$, and $NiOOH/Cu2O/CF$ prepared under the conditions of Example 1, Comparative Example 1, and Example 5, It can be seen from the figure that no other miscellaneous phases exist in the phase synthesized by the invention.

Figure 2:
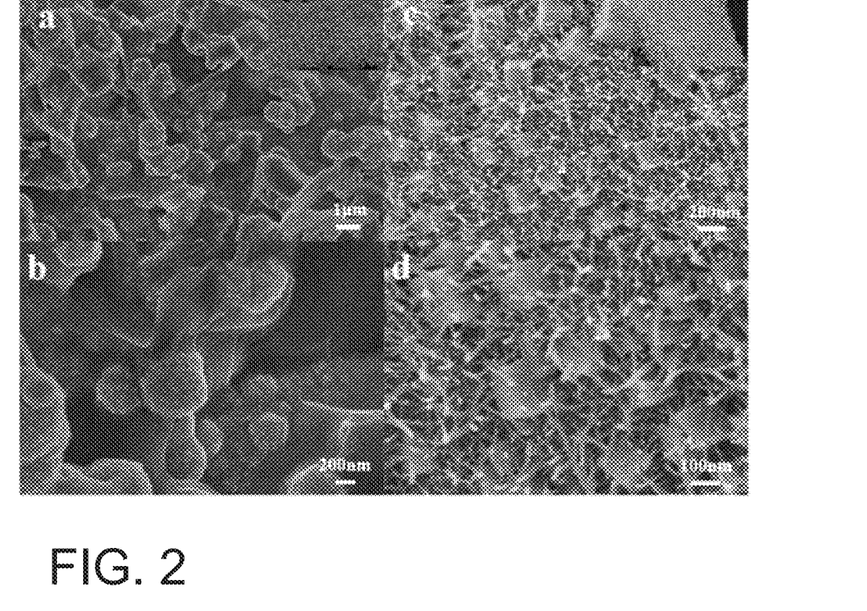
FIG. 2 shows scanning electron microscope (SEM) photographs of (a-b) $NiOOH/Cu_2O/CF$ and (c-d) $Cu_2O/WO_3/CF$ prepared under the conditions of Comparative Example 1 and Example 5.

FIG. 2 shows the scanning electron microscope (SEM) photographs of $NiOOH/Cu_2O/CF$ and $Cu_2O/WO_3/CF$ prepared under the conditions of Comparative Example 1 and Example 5. It can be seen that the $NiOOH/Cu_2O$ in Comparative Example 1 are large particles formed by agglomeration of many small nanoparticles dispersing in the rough surface structure. The $Cu_2O/WO_3$ in Example 5 was a composite structure uniformly dispersed by $WO_3$ nanowires and $Cu_2O$ tetrahedra. These tetrahedrons were of the same size and were entangled by the interwoven nanowire structure at the same time.

Figure 3:
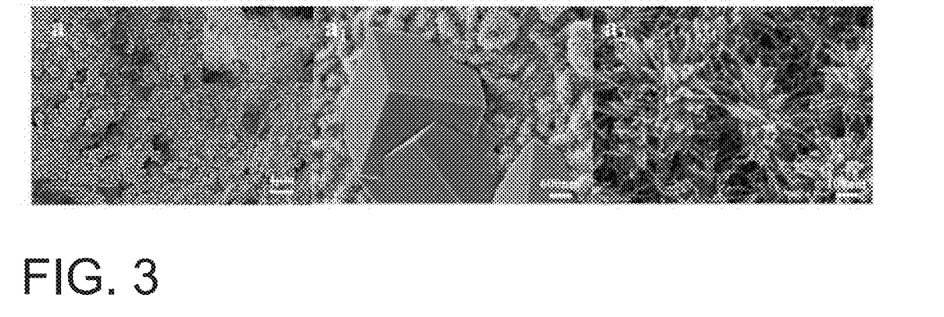
FIG. 3 shows a SEM photograph of $NiOOH/Cu_2O/WO_3/CF$ prepared under the conditions of Example 1.
Figure 4:
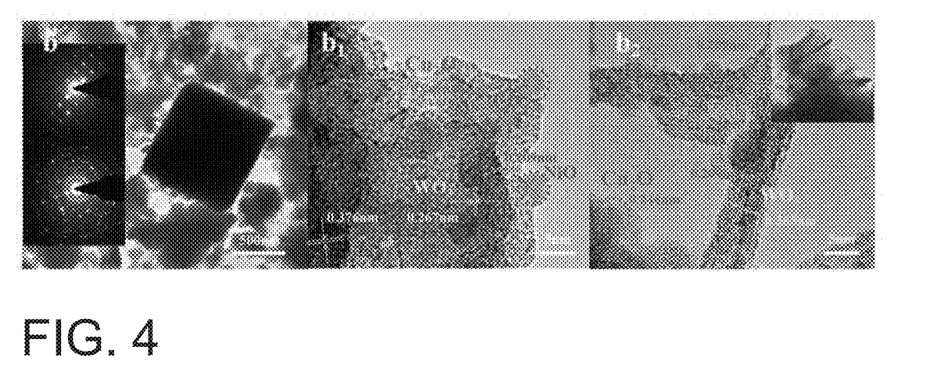
FIG. 4 shows a transmission electron microscopy (TEM) and high-resolution transmission electron microscopy (HR-TEM) image of $NiOOH/Cu_2O/WO_3/CF$ prepared under the conditions of Example 1.
Figure 5:
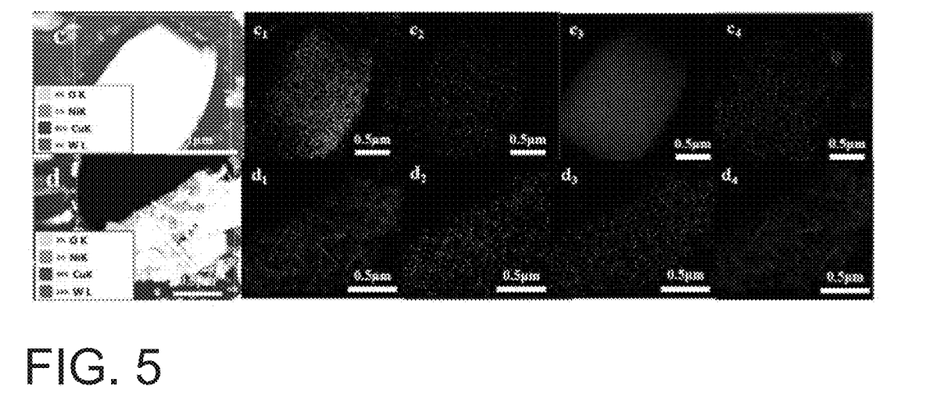
FIG. 5 shows a distribution diagram of corresponding elements of $NiOOH/Cu_2O/WO_3/CF$ prepared under the conditions of Example 1.

FIG. 3 to FIG. 5 respectively show the SEM photos of $NiOOH/Cu_2O/WO_3/CF$ prepared under the conditions of Example 1, and the element distribution of the tetrahedron and nanowire structure in the $NiOOH/Cu_2O/WO_3/CF$ structure. It can be seen that the microstructure of $NiOOH/Cu_2O/WO_3$ grown in foamed copper was similar to $Cu_2O/WO_3$ (FIG. 3). The main elements of the tetrahedron were Cu and O, which further proved that the tetrahedral structure was $Cu_2O$, the nanowire structure was $WO_3$ (FIG. 5), combined with XRD; in addition, it can be seen from FIG. 4 that NiOOH and $Cu_2O$ nanoparticles were uniformly dispersed in the material. The heterojunction surface formed by this $WO_3/Cu_2O/NiOOH$ hierarchical structure was very important for the improvement in electrocatalytic performance.

Figure 6:
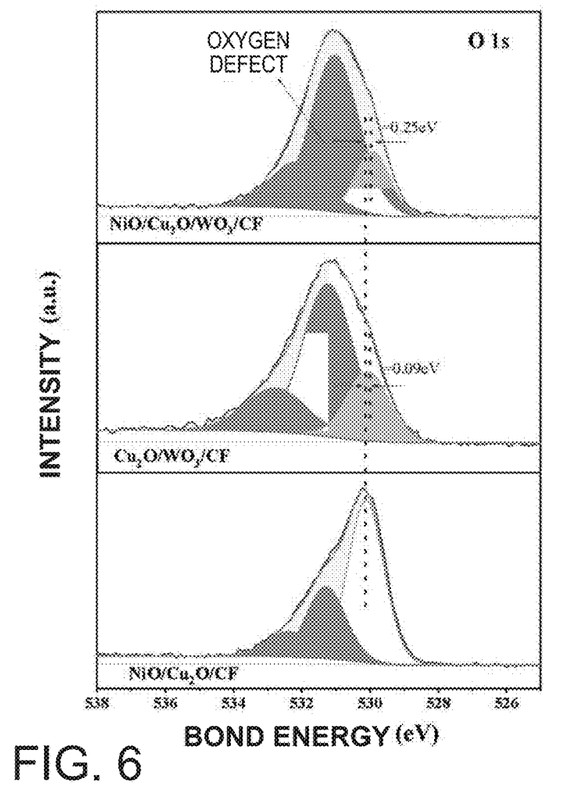
FIG. 6 shows the O1s spectra of $NiOOH/Cu_2O/WO_3/CF$, $Cu_2O/WO_3/CF$, and $NiOOH/Cu_2O/CF$ prepared under the conditions of Example 1, Comparative Example 1, and Example 5.

FIG. 6 shows the O1s spectra of $NiOOH/Cu_2O/WO_3/CF$, $Cu_2O/WO_3/CF$, and $NiOOH/Cu_2O/CF$ prepared under the conditions of Example 1, Comparative Example 1, and Example 5. It can be found that the nickel oxide, oxidized cuprous, and tungsten oxide were grown in situ on the foamed copper by a two-step method, and the oxygen defects in the product were significantly increased, which also further proved that NiOOH was effective for the increase in content of oxygen defects, compared with $Cu_2O/WO_3/CF$ and $NiOOH/Cu_2O/WO_3/CF$ composite materials.

Figure 7:
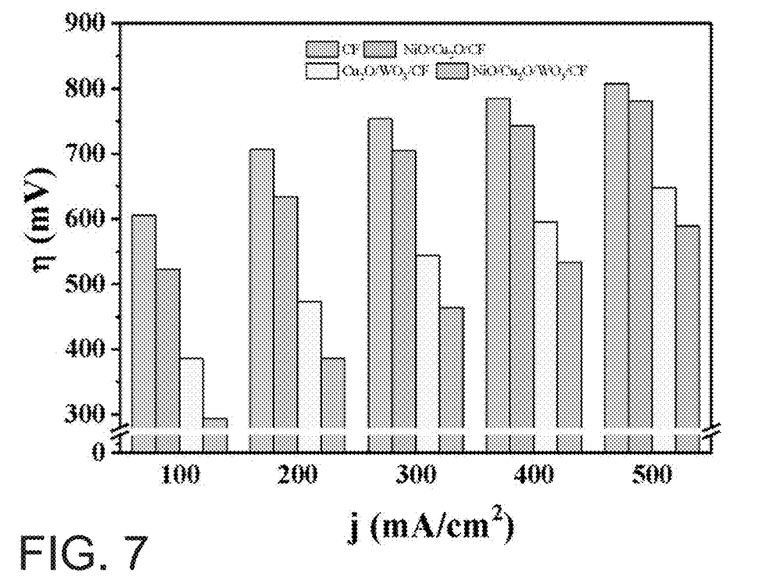
FIG. 7 shows a comparative graph of the electrocatalytic hydrogen production overpotentials at different current densities for $NiOOH/Cu_2O/WO_3/CF$, $Cu_2O/WO_3/CF$, $NiOOH/Cu_2O/CF$, and CF prepared under the conditions of Example 1, Comparative Example 1, and Example 5.
Figure 8:
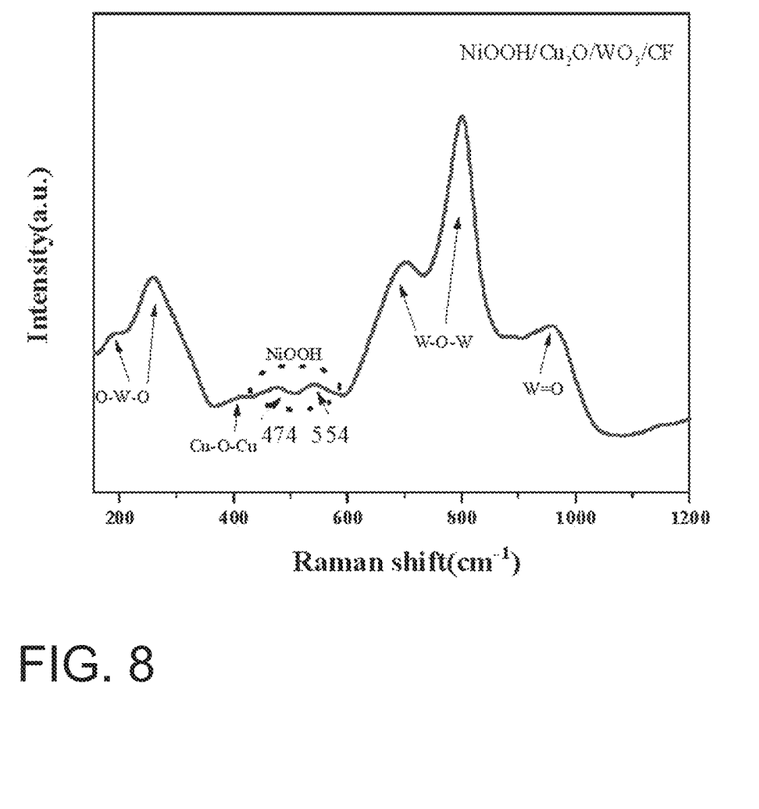
FIG. 8 shows a Raman spectrum of $NiOOH/Cu_2O/WO_3/CF$ prepared under the conditions of Example 1.

FIG. 7 shows a comparative graph of the electrocatalytic hydrogen production overpotentials at different current densities for $NiOOH/Cu_2O/WO_3/CF$, $Cu_2O/WO_3/CF$, $NiOOH/Cu_2O/CF$, and CF prepared under the conditions of Example 1, Comparative Example 1, and Example 5. The obtained electrocatalytic materials were respectively placed into a neutral electrolyte (1M $KH_2PO_4$+1M $K_2HPO_4$) for electrocatalytic testing. It can be seen that the $NiOOH/Cu_2O/WO_3/CF$ electrocatalytic composite material with rich oxygen defect prepared by the present disclosure had the smallest overpotential under different current densities, and its surface had the best hydrogen production performance. At high current densities of 100, 200, 300, 400, and 500 mA/cm², its overpotentials were respectively 294, 386, 464, 533, and 589 mV.

The invention claimed is:
1. A $Cu_2O/WO_3/CF$ self-supporting electrocatalytic material, comprising:
   a foamed copper substrate, and
   $Cu_2O$ and $WO_3$ grown in situ on the foamed copper substrate.
2. The $Cu_2O/WO_3/CF$ self-supporting electrocatalytic material according to claim 1, wherein the total loading capacity of $Cu_2O$ and $WO_3$ is 0.5 to 4 mg/cm².
3. The $Cu_2O/WO_3/CF$ self-supporting electrocatalytic material according to claim 1, wherein the molar ratio of $WO_3$ and $Cu_2O$ is 1:(0.5 to 1).
4. The $Cu_2O/WO_3/CF$ self-supporting electrocatalytic material according to claim 1, wherein the $Cu_2O/WO_3/CF$ self-supporting electrocatalytic material also includes NiOOH grown in situ on the foamed copper substrate.
5. The $Cu_2O/WO_3/CF$ self-supporting electrocatalytic material according to claim 4, wherein the total loading capacity of NiOOH, $Cu_2O$, and $WO_3$ in the $Cu_2O/WO_3/CF$ self-supporting electrocatalytic material is 0.5 to 4 mg/cm².
6. The $Cu_2O/WO_3/CF$ self-supporting electrocatalytic material according to claim 4, wherein the molar ratio of $WO_3$, $Cu_2O$ and NiOOH is 1:(0.5 to 1):(0.01 to 0.05).
7. A preparation method of the $Cu_2O/WO_3/CF$ self-supporting electrocatalytic material of claim 1, comprising:
   (1) dissolving a tungsten source in absolute ethanol to obtain a first solution; and
   (2) immersing the foamed copper in a high-pressure reaction kettle containing the first solution, reacting at 100 to 200° C. for 1 to 36 hours, and then centrifuging, washing, and drying to obtain the $Cu_2O/WO_3/CF$ self-supporting electrocatalyst material.
8. The preparation method according to claim 7, wherein the tungsten source is selected from at least one of ammonium tungstate $(NH_4)_6W_7O_{24}·6H_2O$, ammonium paratungstate $(NH_4)_{10}[H_2W_{12}O_{42}]$, ammonium metatungstate $(NH_4)_6H_2W_{12}O_{40}$, tungsten isopropoxide $W(OCH(CH_3)_2)_6$, and tungsten hexachloride $WCl_6$, and
   the concentration of the tungsten source in the first solution is 0.01 to 5 mol/L.
9. The preparation method according to claim 7, wherein the volume filling ratio of the high-pressure reaction kettle containing the first solution is 20 to 60%.
10. A preparation method of the $Cu_2O/WO_3/CF$ self-supporting electrocatalytic material of claim 4, comprising:
   (1) dissolving a tungsten source in absolute ethanol to obtain a first solution; and

(2) immersing the foamed copper grown with NiOOH and Cu$_2$O in a high-pressure reaction kettle containing the first solution, reacting at 100 to 200° C. for 1 to 36 hours, and then centrifuging, washing, and drying to obtain a NiOOH/Cu$_2$O/WO$_3$/CF self-supporting electrocatalytic material.

11. The preparation method according to claim 10, wherein the foamed copper grown with NiOOH and Cu$_2$O is prepared by:
   (1) dissolving a nickel source in water to obtain a second solution; and
   (2) immersing the foamed copper in a high-pressure reaction kettle containing the second solution, reacting at 160 to 200° C. for 6 to 12 hours, and then washing and drying to obtain the foamed copper with NiOOH and Cu$_2$O.

12. The preparation method according to claim 11, wherein
   the nickel source is selected from at least one of nickel acetate Ni(CH$_3$COO)$_2$, nickel oxalate dihydrate NiC$_2$O$_4$·2H$_2$O, nickel chloride hexahydrate NiCl$_2$·6H$_2$O, and nickel nitrate hexahydrate NiN$_2$O$_6$·6H$_2$O,
   the concentration of the nickel source is 0.01 to 5 mol/L, and
   the volume filling ratio of the high-pressure reaction kettle containing the second solution is 20 to 80%.

* * * * *